Figure 1:
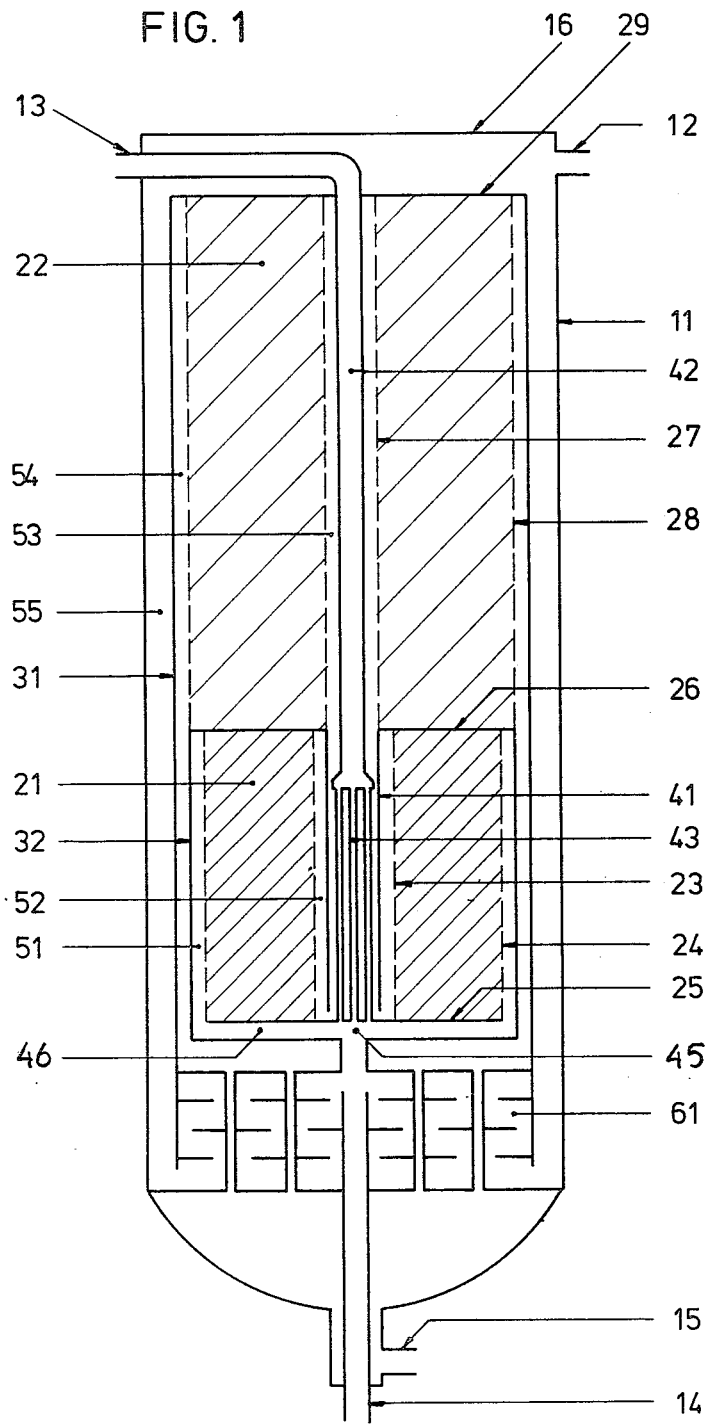

United States Patent [19]

Topsoe et al.

[11] 4,181,701
[45] Jan. 1, 1980

[54] APPARATUS AND PROCESS FOR THE SYNTHESIS OF AMMONIA

[75] Inventors: Haldor F. A. Topsoe, Vedbaek; Erik A. Gam, Humlebaek, both of Denmark

[73] Assignee: Haldor Topsoe A/S, Lyngby, Denmark

[21] Appl. No.: 777,254

[22] Filed: Mar. 9, 1977

[30] Foreign Application Priority Data

Mar. 10, 1976 [GB] United Kingdom ............... 9452/76

[51] Int. Cl.$^2$ .......................... B01J 8/04; C01C 1/04
[52] U.S. Cl. .................................... 422/158; 422/191; 422/192; 422/193; 422/194; 422/203; 422/205; 423/360; 423/361
[58] Field of Search ............... 23/288 L, 288 K, 289; 423/360, 361; 23/288 R; 422/148, 191–194, 203, 205

[56] References Cited
U.S. PATENT DOCUMENTS

| 3,372,988 | 3/1968 | Hansen | 423/360 |
| 3,622,266 | 11/1971 | Laukel | 23/289 X |
| 3,653,846 | 4/1972 | Kubec et al. | 23/289 |
| 3,694,169 | 9/1972 | Fawcett et al. | 23/288 K X |
| 3,918,918 | 11/1975 | Kohn et al. | 23/288 K |
| 3,941,869 | 3/1976 | Fuchs | 423/360 X |
| 3,998,932 | 12/1976 | Collina et al. | 423/360 X |

Primary Examiner—Michael S. Marcus
Attorney, Agent, or Firm—Lawrence Rosen; E. Janet Berry

[57] ABSTRACT

Ammonia converter for radial flow through two catalyst beds has a central heat exchanger mounted centrally in one of the beds. The process stream of synthesis gas is obtained by combining inside the converter separate feed streams: a shell stream serving to cool the converter shell, an exchange stream serving to cool the central heat exchanger, and a by-pass stream for final adjustment of the temperature of the process stream. The process stream passes in succession radially through the first catalyst bed in inwards direction through the central heat exchanger for being cooled, and radially through the second catalyst bed.

7 Claims, 7 Drawing Figures

APPARATUS AND PROCESS FOR THE SYNTHESIS OF AMMONIA

This invention relates to a converter and a process for the synthesis of ammonia at elevated pressure and temperature.

Synthesis of ammonia is conducted by passing a process stream of synthesis gas essentially consisting of three parts of hydrogen and one part of nitrogen through a catalyst arranged in one or more beds in a converter operated at elevated pressure and temperature. However, even if the concentration of hydrogen and nitrogen in the synthesis gas is close to being stoichiometric with respect to ammonia formation, complete reaction to ammonia cannot be obtained by one passage of the process stream through the converter. The reason is that the equilibrium concentration of ammonia in a stoichiometric synthesis gas at normally used operating conditions is below 20% and typically in the range from 15 to 18% measured by volume. Therefore, after most of the ammonia has been removed from the product stream of synthesis gas leaving the converter, the remaining synthesis gas with a residual concentration of ammonia is recycled to the converter together with fresh synthesis gas.

The cost of energy required for compressing and recycling synthesis gas is an important factor in ammonia production. This means that great savings can be achieved by an increase of the amount of ammonia which, at a given set of operating conditions, is produced per unit volume of synthesis gas passed through the catalyst. In other words, a high ammonia concentration in the product stream of synthesis gas from the catalyst is important for the economy of an ammonia process.

The synthesis of ammonia is an exothermic reaction, which means that the temperature of the synthesis gas will increase while it passes through the catalyst. This increasing temperature will displace the equilibrium concentration towards lower ammonia concentration. It is therefore important to limit the temperature increase by cooling of either the catalyst or the synthesis gas. Several methods for providing such cooling are known.

From British patent specification No. 1,204,634 it is known to arrange the catalyst in the converter in two or more separate catalyst beds and to introduce cold synthesis gas between the beds. This can be done by simple means and without too much complication of the operation. However, this method has the disadvantage that the partly reacted synthesis gas will become diluted with unreacted synthesis gas, which means that the ammonia concentration of the product stream of synthesis gas from the last catalyst bed will be lower.

Dilution of the partly reacted synthesis gas can be avoided by another cooling method based on indirect cooling. For this purpose, one or more heat exchangers are built into the converter either directly in a catalyst bed or between the separate catalyst beds. In this way, cooling can be obtained by circulating through such heat exchangers cold synthesis gas which is thereby heated for use in the ammonia synthesis process. The cooling medium used in such heat exchangers can also be water under pressure, which is afterwards used for steam generation.

However, until now the method of indirect cooling has not been very widely used industrially. This is primarily because incorporation of a heat exchanger and associated pipes for communicating the cooling medium to and from the heat exchanger is rather space consuming. Particularly, in cases where the indirect heat exchange is based on steam generation, the necessary equipment is rather complicated because the cooling water has to be communicated through the converter shell to and from an external steam generator.

We have now found that above problems can be reduced or eliminated by conducting the ammonia synthesis in a new converter and by a new process in which the synthesis gas is cooled between the catalyst beds by indirect heat exchange with cooler synthesis gas by using a heat exchanger occupying a minimum of space and offering very easy operation.

Accordingly, we provide a new converter for the synthesis of ammonia at elevated pressure and temperature, comprising:

(a) a converter shell, constituting the outer surface of the converter and of substantially cylindrical shape;

(b) a first catalyst bed of annular shape, mounted between an inner concentric perforated wall, an outer concentric perforated wall and two opposite catalyst plates secured to the perforated walls, through which first catalyst bed the process stream of synthesis gas can be passed in radial direction;

(c) a second catalyst bed shaped and mounted like the first catalyst bed and having its axis in alignment with the axis of the first catalyst bed, and being longer than the first catalyst bed, through which second catalyst bed the process stream of synthesis gas can be passed in radial direction, after having been passed through the first catalyst bed;

(d) centrally mounted inside the inner perforated wall of one of the catalyst beds an intermediate heat exchanger, in which the process stream of synthesis gas is cooled by indirect heat exchange with an exchange stream of synthesis gas;

(e) inlets for separate feed streams of synthesis gas, means for communicating a first feed stream as exchange stream through the heat exchanger to a position on the axis of the converter, in which it is combined with a second feed stream, acting as by-pass stream for adjustment of the process stream temperature.

Furthermore, we provide a process for the synthesis of ammonia at elevated pressure and temperature in the above new converter, comprising the steps of:

(a) obtaining a process stream by combining, at a position along the common axis of the catalyst beds, feed streams of synthesis gas, part of which has initially served in the form of a shell stream to cool the converter shell and, in the form of an exchange stream, to cool the intermediate heat exchanger, another part serving in the form of a by-pass stream to adjust the temperature of the process stream, and (b) passing the process stream at the adjusted temperature in a direction radially through the first catalyst bed through the intermediate heat exchanger and radially through the second catalyst bed.

Figure 5:
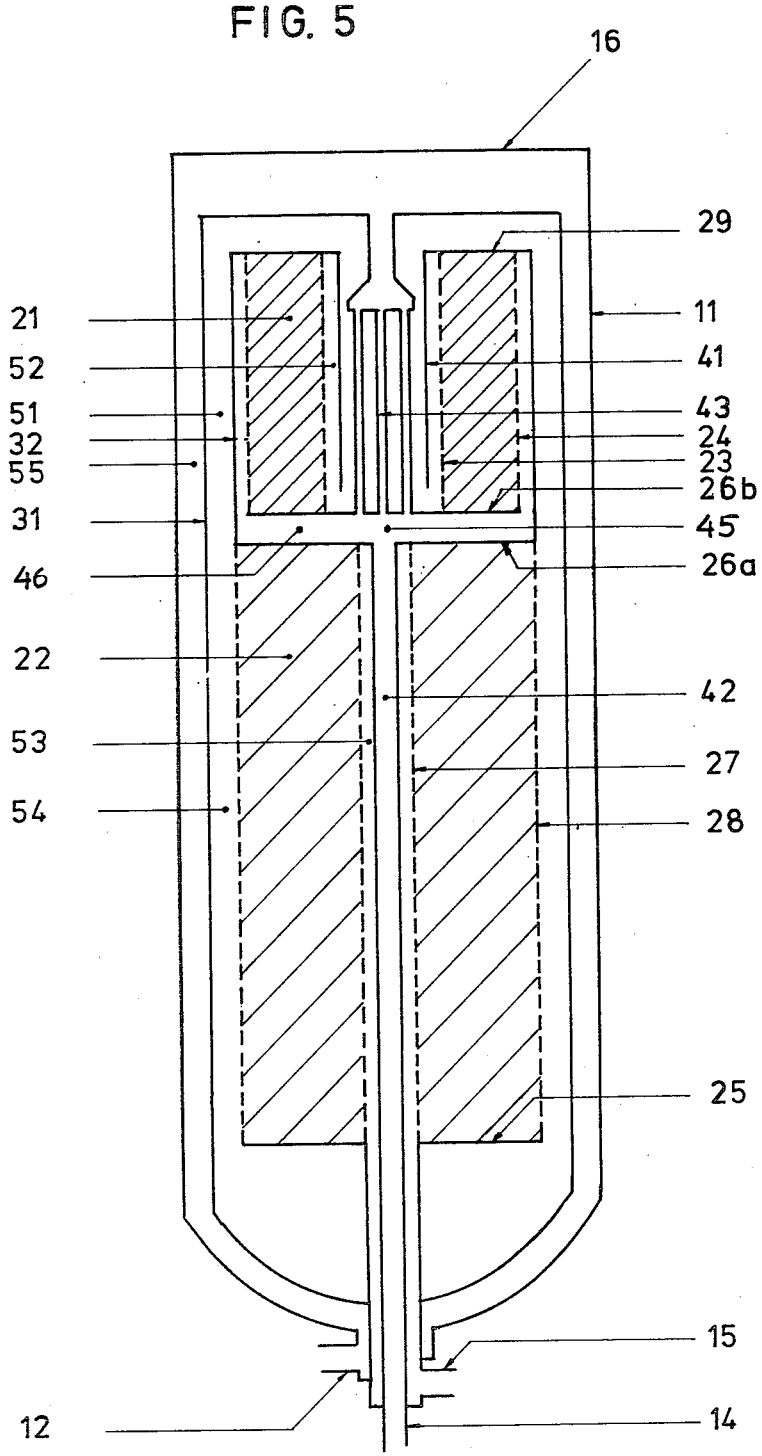
Figure 6:
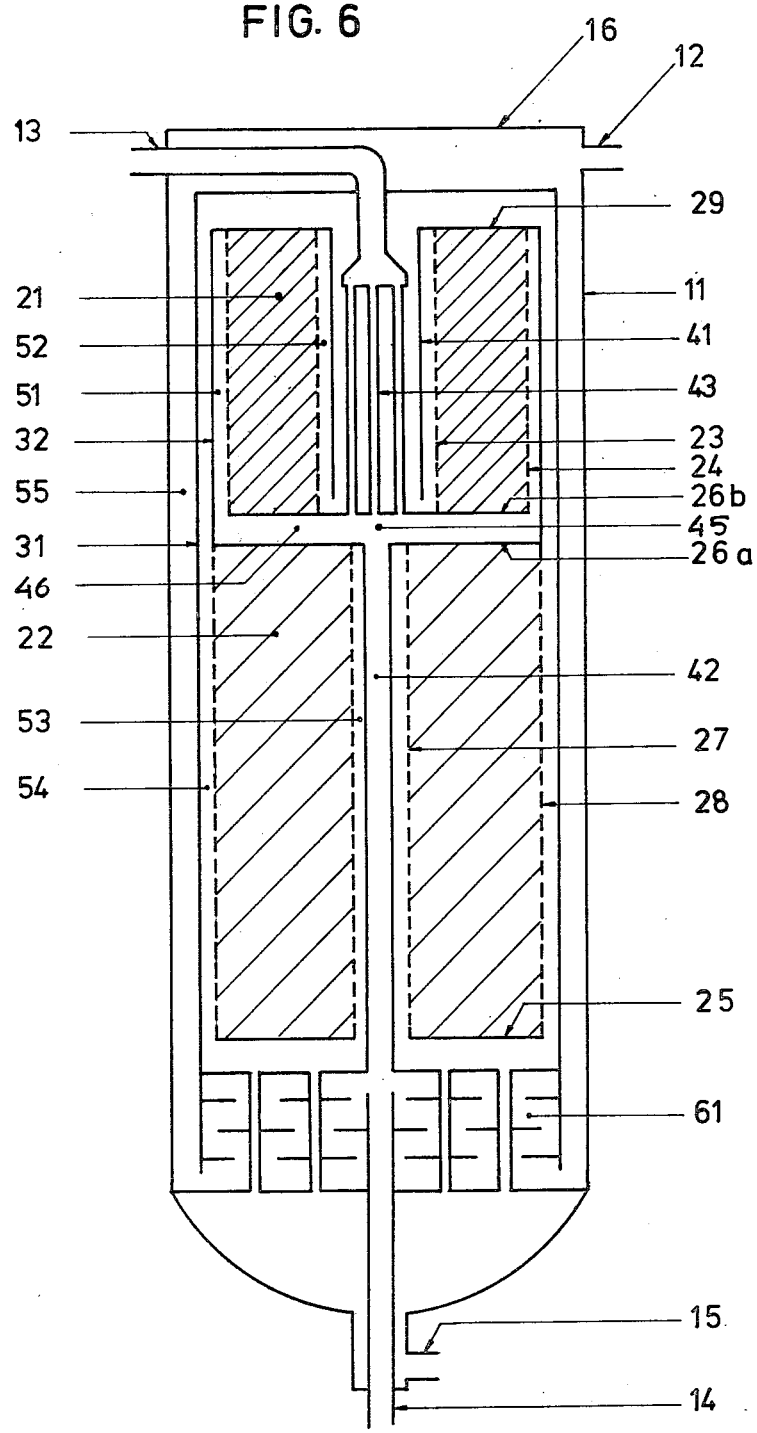
Figure 7:
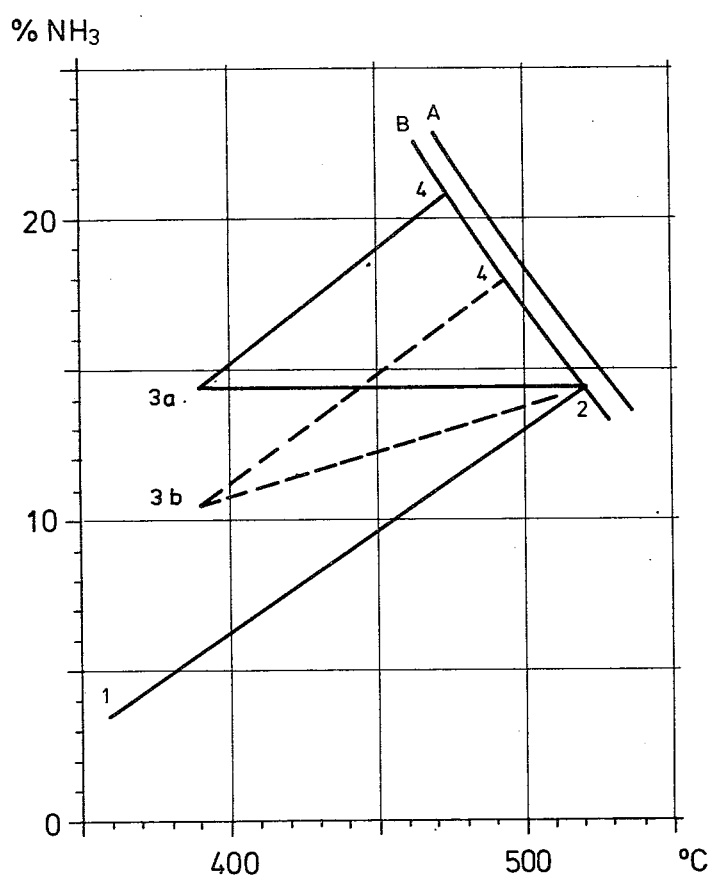

The invention will now be described in detail with reference to the drawings in which FIGS. 1–6 schematically show various embodiments of the converter according to the invention in a longitudinal section through the converter, and FIG. 7 is a diagram in which the process according to the invention is compared with a known process for the production of ammonia.

The converter comprises a converter shell 11 which constitutes the outer surface of the converter. This converter shell is provided with inlets for separate feed streams of synthesis gas, inlet 12 for a shell stream of synthesis gas, inlet 13 for an exchange stream of synthesis gas, and inlet 14 for a by-pass stream of synthesis gas. Furthermore, the converter shell has an outlet 15 for a product stream of synthesis gas. In certain cases, the same feed stream can serve first as the shell stream and subsequently as the exchange stream, so that inlet 13 may be omitted, as illustrated on FIGS. 2, 3, and 5.

The essential parts of the converter according to the invention comprise a first catalyst bed 21, a second catalyst bed 22, a central heat exchanger 41 centrally mounted inside one of the catalyst beds, and a central transfer pipe 42 centrally extending through the other catalyst bed. This central transfer pipe serves to communicate one of the feed streams.

A bottom heat exchanger 61 shown on FIGS. 1 and 6 at the bottom of the converter shell does not form an essential part of the converter according to the invention, and may in certain cases be omitted as shown on FIGS. 2, 3, 4, and 6. To facilitate removal for inspection and maintenance of the essential parts of the converter as well as the attached bottom heat exchanger 61, if present, the converter shell has a removable shell closure 16.

The two catalyst beds 21 and 22 are thus arranged in alignment and around a common axis. They both have a central cylindrical space around this axis. Mounted in the cylindrical space of one of the catalyst beds is the central heat exchanger 41 and in the cylindrical space of the other catalyst bed is the central transfer pipe 42.

The first catalyst bed 21 has an annular shape and is mounted between two concentric perforated walls, an inner wall 23 and an outer wall 24. These perforated walls are at their lower ends secured to a catalyst plate 25, which carries the catalyst in the first catalyst bed. At their upper ends the perforated walls are secured to a catalyst plate 26, which closes the first catalyst bed and at the same time serves to carry the catalyst in the second catalyst bed. To facilitate loading and unloading of the catalyst in the first catalyst bed 21, the catalyst plate 26 is provided with removable lids (not shown on FIG. 1) which can be opened when the second catalyst bed is empty.

Like the first catalyst bed 21, the second catalyst bed 22 has an annular shape and is mounted between two concentric perforated walls, an inner wall 27 and an outer wall 28. At their lower ends these perforated walls are secured to the catalyst plate 26 and at their upper ends they are secured to a catalyst plate 29. The catalyst plate 29 can be entirely removed during loading and unloading of the the catalyst or parts of it can be opened.

In order to provide optimum process conditions, a larger amount of catalyst will be required for the second catalyst bed 22 than that required for the first catalyst bed 21. Therefore, the second catalyst bed 22 will be longer than the first catalyst bed 21.

The central heat exchanger 41 is mounted in the central cylindrical space of the first catalyst bed 21. Between the central heat exchanger and the inner perforated wall 23 is an annular space 52 for receiving the process stream from the first catalyst bed. The central heat exchanger 41 may be of the type having a plurality of parallel tubes 43 as illustrated on FIG. 1. In this type the cooling medium, the exchange stream, passes through the tubes, while the process stream from annular space 52 flows around the tubes for being heated before it passes to the second catalyst bed 22. However, the central heat exchanger may be of any suitable type, such as for instance of the lamella type, which will serve the same purpose.

The central transfer pipe 42 is mounted in the central cylindrical space of the second catalyst bed and serves to communicate the exchange stream to the central heat exchanger 41. Between the central transfer pipe 42 and the inner perforated wall 27 is an annular space 53 for receiving the process stream to the second catalyst bed 22.

A cylindrical sheet 31 provides an annular space 55 along the converter shell 11 for the shell stream of synthesis gas introduced through inlet 12 and an annular space 54 around the second catalyst bed 22. Another cylindrical sheet 32 surrounds the first catalyst bed 21 and provides an annular space 51. There are further passageways for communicating the shell stream of synthesis gas from the annular space 55 through the bottom heat exchanger 61 to the annular space 51. While passing through these passageways, the shell stream of synthesis gas will combine with the by-pass stream of synthesis gas introduced through inlet 14 and the exchange stream of synthesis gas from the central heat exchanger 41 to form the process stream of synthesis gas to be passed through the first catalyst bed 21.

The passageways for each of the feed streams meet at a point 45 at the common axis for the catalyst beds. From this point 45 the synthesis gas stream is directed radially outwards through a radial passage 46 to the outside of the first catalyst bed. The radial passage serves to mixing the feed streams to eliminate any temperature differences in the synthesis gas when introduced in the first catalyst bed.

FIGS. 2, 3, 4, 5, and 6 illustrate other embodiments of the converter of the invention. In four of these (FIGS. 2, 3, 4, and 5) the bottom heat exchanger 61 illustrated on FIG. 1 has been omitted, while in two (FIGS. 5 and 6) the flow direction through the second catalyst bed has been reversed to inwards direction. Furthermore, the positions of various items have been varied relative to FIG. 1. This has required rearrangement of inlets for the feed streams and modifications of the passage-ways for streams of synthesis gas inside the apparatus. However, all essential features of the converter and their functions remain unchanged, and in all figures the same numerals have been used to designate like items. Therefore, FIGS. 2, 3, 4, 5, and 6 will only be described insofar as there are significant deviations from FIG. 1.

Figure 2:
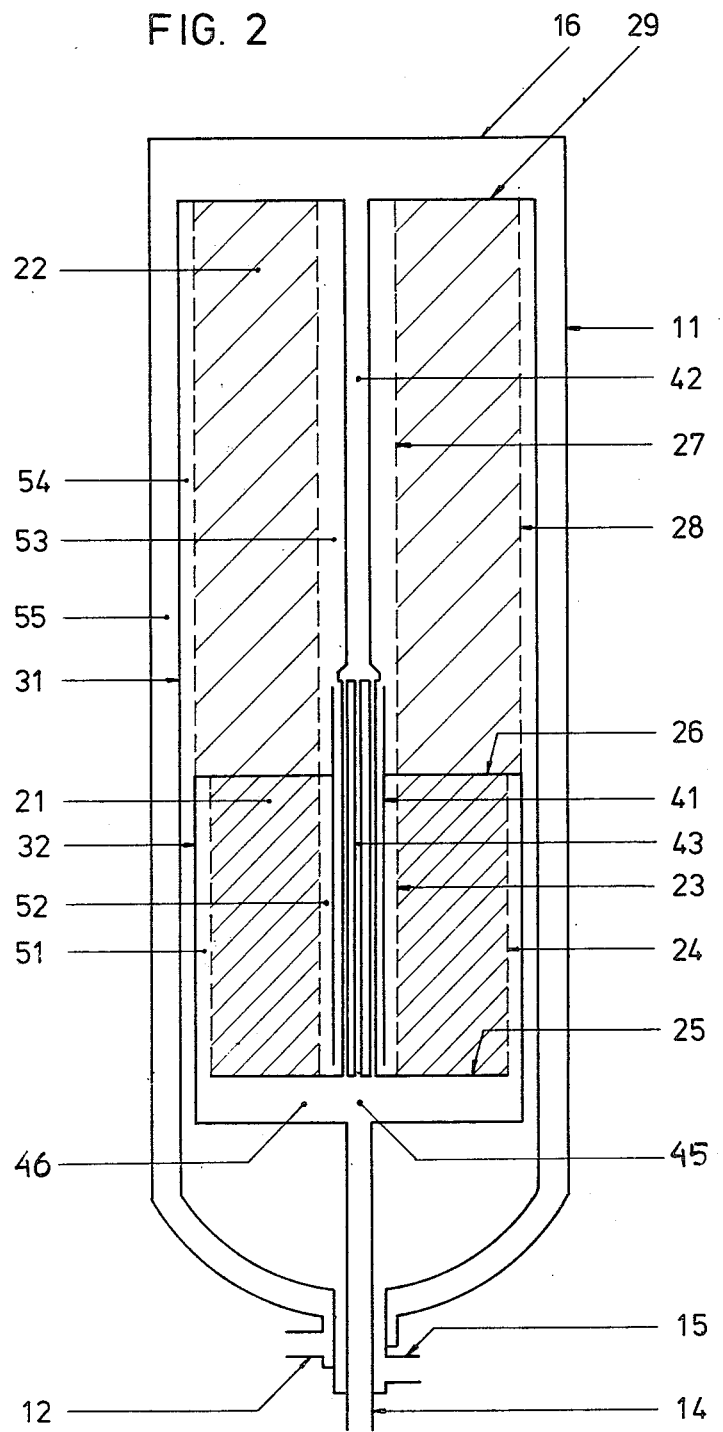

In FIG. 2 the shell stream of synthesis gas subsequently serves as the exchange stream. Consequently, inlet 13 for the exchange stream of synthesis gas has been omitted and the central pipe 42 is connected so that it receives the shell stream and communicates it to the central heat exchanger 41 where it serves as the exchange stream. In all other respect the relative arrangement of the various items of the converter is the same as in FIG. 1, except that the bottom heat exchanger is omitted.

Figure 3:
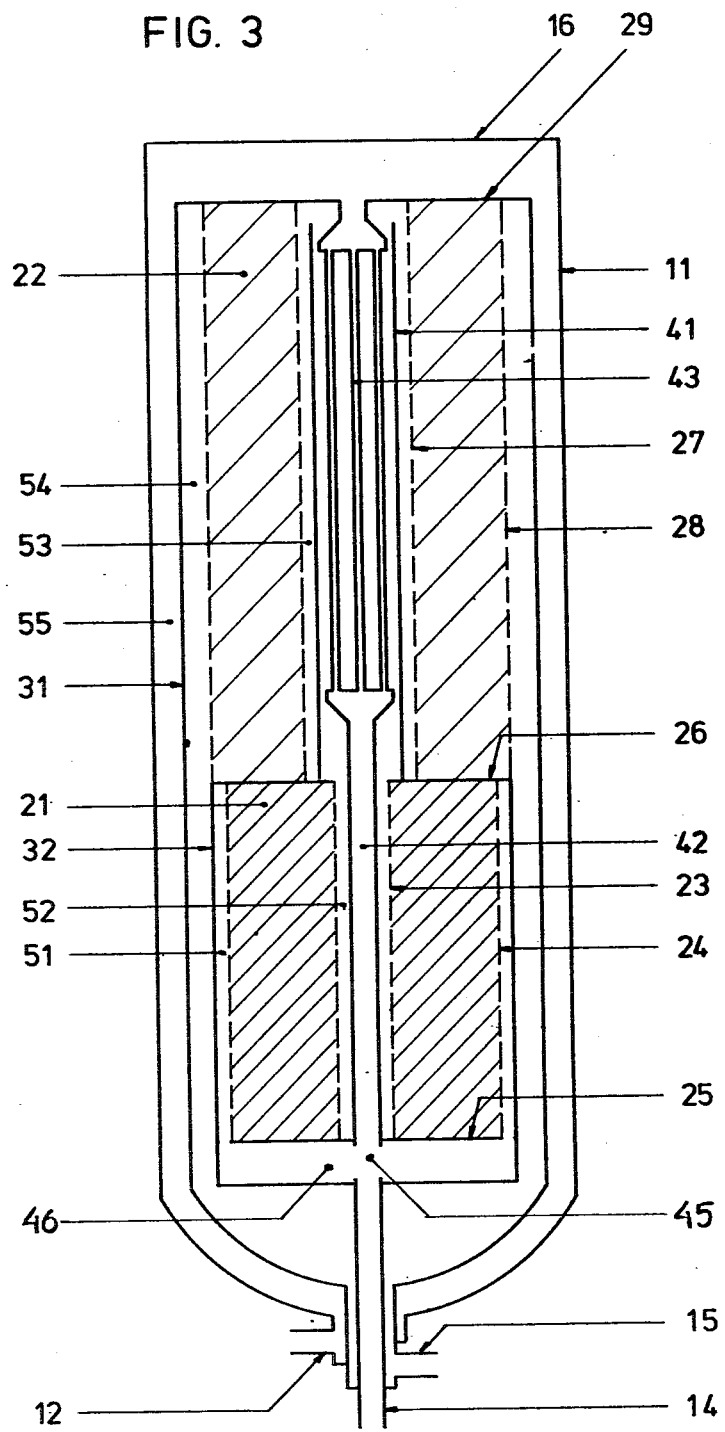

The only difference between FIG. 3 and FIG. 2 is that in FIG. 3 the central heat exchanger 41 is mounted at the level of the second catalyst bed 22. This means that the shell stream can be passed direct to the central heat exchanger 41 to serve as the exchange stream, while the central transfer pipe 42 receives the exchange stream from the central heat exchanger 41. Further consequences are that the annular space 53 is located between the inner wall 27 and the central heat exchanger 41, and the annular space 52 is located between the inner wall 23 and the central transfer pipe 42.

Figure 4:
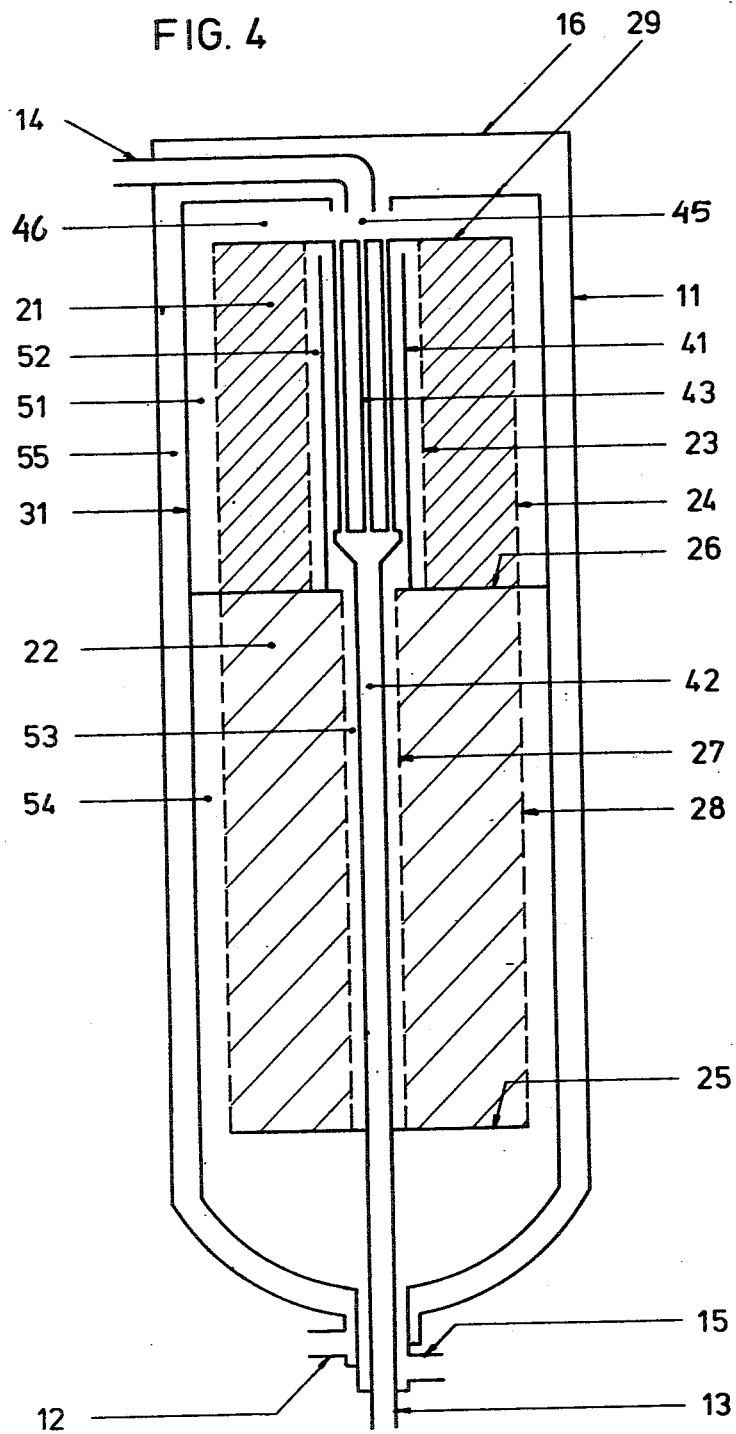

In FIG. 4 the first catalyst bed 21 is mounted above the second catalyst bed 22, i.e. the first catalyst bed 21 is carried by the catalyst plate 26 and closed by the catalyst plate 29, while the second catalyst bed 22 is carried by the catalyst plate 25 and closed by the catalyst plate 26. In all other respect the catalyst plates 25, 26, and 29 have the same functions as in FIG. 1. The central heat exchanger 41 is mounted at the level of the first catalyst bed 21. It is seen from FIG. 4 that this relative position of the catalyst beds has simplified the passageways for the various streams of synthesis gas so that sheet 32 is not required for providing the annular space 51 and consequently has been omitted.

In FIG. 5 the relative positions of the first catalyst bed 21, the second catalyst bed 22, and the central heat exchanger 41 are as in FIG. 4. However, rearrangements of passageways for various streams have been made to provide for having inwards flow of the process stream through the second catalyst bed 22, i.e. from annular space 54 through the bed to annular space 53. This has in particular required the catalyst plate 26 in FIG. 4 to be replaced by two separate catalyst plates 26a and 26b in FIG. 5 to provide passageway between the first catalyst bed 21 and the second catalyst bed 22. Similarly, annular sheet 32 which could be omitted from FIG. 4 has been inserted on FIG. 5 to provide annular space 51 around the first catalyst bed 21.

Finally, the embodiment illustrated on FIG. 6 is substantially similar to the embodiment illustrated on FIG. 5 except that FIG. 6 has a bottom heat exchanger 61.

In the embodiments of the converter illustrated on FIGS. 5 and 6, the presence of two separate catalyst plates 26a and 26b for providing a passageway between the two catalyst beds 21 and 22 has further provided a possibility for removing separately from the converter the first catalyst bed 21 with the central heat exchanger 41 for inspection, maintenance or catalyst replacement.

The process for the synthesis of ammonia at elevated pressure and temperature in accordance with this invention will now be outlined in general with reference to the converter illustrated on FIGS. 1, 2, 3, 4, 5, and 6.

A process stream of synthesis gas to be passed through the catalyst beds is obtained by combining two or more feed streams of synthesis gas. These feed streams are a shell stream introduced through inlet 12, an exchange stream introduced through inlet 13, and a by-pass stream introduced through inlet 14. In certain cases where no bottom heat exchanger is present, the shell stream may subsequently serve as the exchange stream, and inlet 13 for the latter can therefore be omitted (FIGS. 2, 3, and 5), however even if no bottom heat exchanger is present, it may be preferable for flexibility of operation to have separate feed streams serving as the shell stream and as the exchange stream (FIG. 4). In all cases where the bottom heat exchanger 61 is present, separate feed streams serving as the shell stream and as the exchange stream are required (FIGS. 1 and 6).

The process stream of synthesis gas, which by proper adjustment of the rates and temperatures of the various streams has obtained a temperature as required for the catalyst installed in the first catalyst bed, is passed from annular space 51 radially inwards through the first catalyst bed 21 for being received in annular space 52. Thereafter, the process stream of synthesis gas is passed through the hot side of the central heat exchanger 41 for being cooled by indirect heat exchange with the exchange stream of synthesis gas before being passed to annular space 53 (FIGS. 1, 2, 3, and 4) or annular space 54 (FIGS. 5 and 6). From there the process stream of synthesis gas is passed radially through the second catalyst bed 22, and a product stream of synthesis gas is obtained in annular space 54 (FIGS. 1, 2, 3, and 4) or annular space 53 (FIGS. 5 and 6).

EXAMPLE 1

For an ammonia plant having a production capacity of 1,000 metric tons per day of ammonia and using a converter as shown on FIG. 1 the process of the invention can be conducted essentially as described in this example.

The two catalyst beds are loaded with an ammonia synthesis catalyst having a particle size of 1.5–3 mm. Catalyst volumes are 12 $m^3$ in the first catalyst bed 21 and 29 $m^3$ in the second catalyst bed 22. The composition of the synthesis gas available for the various bed streams is given in Table I together with the composition of the product stream and further data related to this Example 1. The converter is operated at a pressure of about 270 $kg/cm^2$ g.

A shell stream of synthesis gas of 151,480 $Nm^3/hr.$, having a temperature of about 120° C., is introduced through the inlet 12. The shell stream is first passed through the annular space 55, where it serves to provide adequate cooling of the converter shell for protection against too high temperatures. Thereafter, the shell stream is passed to the bottom heat exchanger 61. Here the shell stream is heated by indirect heat exchange with the product stream which afterwards leaves the converter through the outlet 15.

An exchange stream of synthesis gas of 191,450 $Nm^3/hr.$, having a temperature of about 120° C., is introduced through the inlet 13 and via the central transfer pipe 42 passed through the central heat exchanger 41. Here the exchange stream serves to cool the process stream passed from the first catalyst bed 21 to the second catalyst bed 22. The exchange stream leaves the central heat exchanger at a temperature close to the reaction temperature and is combined with the shell stream from the bottom heat exchanger 61.

A by-pass stream of synthesis gas of 40,000 $Nm^3/hr.$, having a temperature of about 120° C., is introduced through the inlet 14. At a position along the common axis of the two catalyst beds, the by-pass stream combines with the shell stream and the exchange stream to form a process stream of synthesis gas of 382,930 $Nm^3/hr.$, having a temperature of 360° C. The relative amounts of the three streams which form the process stream can be adjusted during operation to obtain the desired temperature at the inlet to the first catalyst bed 21.

Via the annular space 51 the process stream is passed through the first catalyst bed 21, where its temperature is increased to 520° C. because of the exothermic reaction, which causes the ammonia concentration to increase from 3.5 to 14.4 vol.%. While subsequently passing through the central heat exchanger 41, the process stream is cooled to 390° C. and via the annular space 53 passed through the second catalyst bed 22 under heating to 472° C., while the ammonia concentration increases to 20.8 vol.%. The product stream of synthesis gas is then received in the annular space 55 and passed through the bottom heat exchanger 61 for cooling and thereafter through the outlet 15 at about 360° C.

EXAMPLES 2-6

Data for further examples on conducting ammonia synthesis in accordance with this invention are given in Table I. The Examples 2-6 are similar to Example I, except that they are conducted in the other embodiments of the converter as illustrated on the FIGS. 2-6.

TABLE I

| Example | | 1-6 |
|---|---|---|
| Embodiment of Converter, Fig. | | 1-6 |
| Production Capacity of Converter, metric tons/day | | 1,000 |
| Catalyst Volume, m³ | | |
| First Bed | | 12 |
| Second Bed | | 19 |
| Stream Composition, vol. % | | |
| Feed Stream, inlet first bed, | $H_2$ | 63.4 |
| | $N_2$ | 21.1 |
| | $NH_3$ | 3.5 |
| | inerts | 12.0 |
| Feed Stream, outlet first bed, | $H_2$ | 54.2 |
| | $NH_2$ | 18.1 |
| | $NH_3$ | 14.4 |
| | inerts | 13.3 |
| Product Stream, outlet second bed, | $H_2$ | 48.9 |
| | $N_2$ | 16.3 |
| | $NH_3$ | 20.8 |
| | inerts | 14.0 |

TABLE II

| Example | 1 | 2 | 3 | 4 | 5 | 6 |
|---|---|---|---|---|---|---|
| Embodiment of Converter, fig. | 1 | 2 | 3 | 4 | 5 | 6 |
| Stream Rates, Nm³/h | | | | | | |
| Shell Stream | 151,480 | 322,930 | 322,930 | 322,930 | 322,930 | 131,480 |
| Exchange Stream | 191,450 | | | | | 211,450 |
| By-pass Stream | 40,000 | 60,000 | 60,000 | 60,000 | 60,000 | 40,000 |
| Total Process Stream, inlet first bed | 382,930 | 382,930 | 382,930 | 382,930 | 382,930 | 382,930 |
| Product Stream, outlet converter | 328,090 | 328,090 | 328,090 | 328,090 | 328,090 | 328,090 |
| Stream Temperature, °C. | | | | | | |
| Feed Streams, inlet converter | 110 | 237 | 237 | 237 | 237 | 150 |
| Process Stream, inlet first bed | 360 | 360 | 360 | 360 | 360 | 360 |
| Process Stream, outlet first bed | 520 | 520 | 520 | 520 | 520 | 520 |
| Process Stream, inlet second bed | 390 | 390 | 390 | 390 | 390 | 390 |
| Process Stream, outlet second bed | 472 | 472 | 472 | 472 | 472 | 472 |
| Proces Stream, outlet converter | 345 | 472 | 472 | 472 | 472 | 385 |

As it can be seen from the Examples 1 and 6 the bottom heat exchanger 61 serves to cool the product gas before it leaves the converter through the outlet 15 of the converter shell. Without this cooling the product gas will leave the converter shell at much higher temperatures. Although such high temperatures require a more careful selection of heat resistant materials of construction, the bottom heat exchanger is omitted in cases where it is desirable to utilize the heat of the product gas for production of high pressure steam. Therefore, the bottom heat exchanger has been omitted in Examples 2-5 (FIGS. 2-5).

An essential economic advantage of the converter and the process of this invention is that it is possible to obtain a high production of ammonia per unit volume of synthesis gas passed through the catalyst beds. This high production is achieved as a result of the cooling without dilution of the process stream of synthesis gas between the two catalyst beds combined with the possibility of obtaining the desired temperatures of the process stream at the entrance of each catalyst bed. For an optimum performance of the ammonia synthesis catalyst it is imperative that the temperatures of each catalyst bed can be independently selected. This is possible in the converter and the process of this invention because of the flexibility in changing the relative rates of the different streams of synthesis gas.

This advantage of the converter and the process in accordance with this invention can be further illustrated by curves showing variations in temperature and ammonia concentration as the process stream of synthesis gas is passing through the two catalyst beds. In FIG. 7, curve A represents thermodynamic equilibrium concentration at the conditions of pressure and synthesis gas composition used in Example 1. Curve B illustrates an approach to this equilibrium by 10° C. corresponding to a reasonable approach, which can be obtained in practice.

The remaining curves on FIG. 7 represent changes occurring in the temperature and the ammonia concentration of process stream of synthesis gas during its passage through the catalyst beds for two different cases. One case, represented by the solid line, corresponds to the conditions of Example 1. In this case, the synthesis gas is introduced into the first catalyst bed at a temperature of 360° C. and having an ammonia concentration of 3.5%. While the process stream is passing through the first catalyst bed, these two parameters will change along the solid line 1-2, so that at the outlet of the first catalyst bed the temperature is 520° C. and the ammonia concentration is 14.4%. Before being introduced into the second catalyst bed, the process stream of synthesis gas is cooled by indirect heat exchange, which means that the parameters will change along the solid line 2-3a (ammonia concentration is kept constant). At the inlet to the second catalyst bed, the temperature is 390° C. and the ammonia concentration is 14.4%.

While the process stream is passing through the second catalyst bed, the parameters will change along the solid line 3a-4, so that at the outlet of the second catalyst bed the temperature is 472° C. and the ammonia concentration is 20.8%.

The other case, represented by the dotted line on FIG. 7, corresponds to conditions similar to those used for Example 1, except that instead of cooling the process stream between the catalyst beds by indirect heat exchange, the cooling is effected by direct quench. This has no effect for the first catalyst bed and the parameters will again change along the solid line 1-2. During the cooling, however, the ammonia concentration will decrease because the cooling gas added to the synthesis gas from the first catalyst bed has a lower ammonia concentration. Accordingly, the parameters will change along the dotted line 2–3b. At the inlet to the second catalyst bed the temperature is 390° C., however, because of the dilution the ammonia concentration is only 10.5%. During the passage through the second catalyst bed, the parameters will change along the dotted line 3b–4 and at the outlet of the second catalyst bed the temperature is 493° C. and the ammonia concentration 18.0%.

These curves shown on FIG. 7 illustrate the advantage of conducting ammonia synthesis under use of the converter and the process of the present invention. As a result of the invention the production of ammonia per unit volume of synthesis gas passed through the catalyst beds has been significantly increased.

We claim:

1. A converter for the synthesis of ammonia by passing a process stream of synthesis gas at elevated temperature and pressure through separate catalyst beds contained therein, comprising:

(a) a converter shell of substantially cylindrical shape with its axis in vertical position comprising an outer imperforated shell surface having at its upper end a removable shell closure and having at least two inlet means for introducing feed streams of synthesis gas into said converter, at least one of said inlet means being positioned at the lower end of said converter and at least one outlet means positioned at the lower end of said converter for withdrawing from said converter a product stream of synthesis gas;

(b) an imperforated inner cylindrical sheet concentrically located within said outer shell to provide an annular space for a shell stream to cool said converter shell before forming part of said process stream;

(c) a first catalyst bed of annular shape, mounted in the upper end of said converter concentrically around the axis of said converter shell between an inner perforated wall, an outer perforated wall, said outer perforated wall being spaced from said inner cylindrical sheet, and two annular opposite, horizontal catalyst plates secured to said perforated walls, through which first catalyst bed said process stream, formed by combining said separate feed streams, is inwardly passed in radial direction;

(d) a second catalyst bed of annular shape, mounted in the lower end of said converter concentrically around the axis of said converter shell between an inner perforated wall, an outer perforated wall, said outer perforated wall being spaced from said inner cylindrical sheet, and two annular opposite, horizontal catalyst plates secured to said perforated walls, one of said annular horizontal plates being connected to said inner cylindrical sheet, said second catalyst bed being longer than said first catalyst bed, through which second catalyst bed said process stream from said first catalyst bed, after having being cooled by indirect heat exchange, is passed in radial direction;

(e) centrally mounted around the axis of said converter shell an intermediate plural tube heat exchange means, in which said process stream from said first catalyst bed is cooled by indirect heat exchange with an exchange stream of synthesis gas before being passed through said second catalyst bed;

(f) means for passing a first feed stream, which is acting as said exchange stream, from one of said inlet means through passageway means to and further through said intermediate heat exchange means to a position on the axis of said converter shell just upstream of said first catalyst bed to form part of said process stream;

(g) means for passing a second feed stream, which is acting as a by-pass stream for adjustment of the temperature of said process stream, said by-pass means extending from another of said inlet means, located at the lower end of said shell, to said position for combination with said first feed stream to form part of said process stream; and (h) baffle means, said converter shell, and said inner cylindrical sheet providing annular spaces around said first and second catalyst beds for passing said process stream in succession from said position where it is formed by combination of said separate feed streams through said first catalyst bed, said intermediate heat exchanger, and said second catalyst bed to said outlet means.

2. The converter of claim 1 wherein said passageway is provided by arranging said annular space for said shell stream in free communication with said inlet means for said first feed stream and said intermediate heat exchange means, so that said first feed stream during passage of said passageway will act as said shell stream for cooling said converter shell before acting as said exchange stream.

3. The converter of claim 1 wherein at least two inlet means are positioned at the lower end of said converter; and said passageway is provided by a central transfer pipe in free communication with one of said two inlet means positioned at the lower end and said intermediate heat exchange means; which converter further comprises means for passing a third feed stream, which is acting as said shell stream for cooling said converter shell, from another of said two inlet means positioned at the lower end through said annular space to said position for combination with said first feed stream and said second feed stream to form part of said process stream.

4. The converter of claim 1 wherein at least two inlet means are positioned at the upper end of said converter; and said passageway is connected to one of said two inlet means positioned at the upper end; which converter further comprises means for passing a third feed stream, which is acting as said shell stream for cooling said converter shell, from another of said two inlet means positioned at the upper end through said annular space to said position for combination with said first feed stream and said second feed stream to form part of said process stream.

5. A converter for the synthesis of ammonia by passing a process stream of synthesis gas at elevated temperature and pressure through separate catalyst beds contained therein, comprising:

(a) a converter shell of substantially cylindrical shape with its axis in vertical position comprising an outer imperforated shell surface having at its upper end a removable shell closure and having at least two inlet means for introducing feed streams of synthesis gas into said converter, at least one of said inlet means being positioned at the lower end of said converter and at least one outlet means positioned at the lower end of said converter for withdrawing from said converter a product stream of synthesis gas;

(b) an imperforated inner cylindrical sheet concentrically located within said outer shell to provide an annular space for a shell stream to cool said converter shell before forming part of said process stream;

(c) a first catalyst bed of annular shape, mounted in the lower end of said converter concentrically around the axis of said converter shell between an inner perforated wall, an outer perforated wall, said outer perforated wall being spaced from said inner cylindrical sheet, and two annular opposite, horizontal catalyst plates secured to said perforated walls, through which first catalyst bed said process stream, formed by combining said separate feed streams, is inwardly passed in radial direction;

(d) a second catalyst bed of annular shape, mounted in the upper end of said converter concentrically around the axis of said converter shell between an inner perforated wall, an outer perforated wall, said outer perforated wall being spaced from said inner cylindrical sheet, and two annular opposite, horizontal catalyst plates secured to said perforated walls, said second catalyst bed being longer than said first catalyst bed, through which second catalyst bed said process stream from said first catalyst bed, after having been cooled by indirect heat exchange, is passed in radial direction;

(e) centrally mounted around the axis of said converter shell an intermediate plural tube heat exchange means, in which said process stream from said first catalyst bed is cooled by indirect heat exchange with an exchange stream of synthesis gas before being passed through said second catalyst bed;

(f) means for passing a first feed stream, which is acting as said exchange streams, from one of said inlet means through passageway means to and further through said intermediate heat exchange means to a position on the axis of said converter shell just upstream of said first catalyst bed to form part of said process stream;

(g) means for passing a second feed stream, which is acting as a by-pass stream for adjustment of the temperature of said process stream, said by-pass means extending from another of said inlet means, positioned at the lower end of said converter to said position for combination with said first feed stream to form part of said process stream; and (h) baffle means, said converter shell, and said inner cylindrical sheet providing annular spaces around said first and second catalyst beds for passing said process stream in succession from said position where it is formed by combination of said separate feed streams through said first catalyst bed, said intermediate heat exchanger, and said second catalyst bed to said outlet means.

6. The converter of claim 5 wherein said passageway is provided by arranging said annular space for said shell stream in free communication with said inlet means for said first feed stream and said intermediate heat exchange means, so that said first feed stream during passage through said passageway will act as said shell stream for cooling said converter shell before acting as said exchange stream.

7. The converter of claim 5 wherein at least two inlet means are positioned at the upper end of said converter; and said passageway is provided by a central transfer pipe in free communication with one of said two inlet means positioned at the upper end and said intermediate heat exchange means; which converter further comprises means for passing a third feed stream, which is acting as said shell stream for cooling said converter shell, from another of said two inlet means positioned at the upper end through said annular space to said position for combination with said first feed stream and said second feed stream to form part of said process stream.

* * * * *